(12) United States Patent
Lee

(10) Patent No.: US 9,618,364 B2
(45) Date of Patent: Apr. 11, 2017

(54) INTEGRATED WHEEL SPEED MEASURING DEVICE

(71) Applicant: HYUNDAI MOBIS CO., LTD., Seoul (KR)

(72) Inventor: Euisung Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 34 days.

(21) Appl. No.: 14/459,581

(22) Filed: Aug. 14, 2014

(65) Prior Publication Data

US 2015/0137803 A1 May 21, 2015

(30) Foreign Application Priority Data

Nov. 19, 2013 (KR) ........................ 10-2013-0140989

(51) Int. Cl.
*G01P 3/42* (2006.01)
*G01D 5/12* (2006.01)
*F16C 41/00* (2006.01)
*F16C 33/72* (2006.01)
*G01P 3/44* (2006.01)
*F16C 19/18* (2006.01)

(52) U.S. Cl.
CPC ............. *G01D 5/12* (2013.01); *F16C 33/723* (2013.01); *F16C 41/007* (2013.01); *G01P 3/443* (2013.01); *F16C 19/186* (2013.01); *F16C 2326/02* (2013.01)

(58) Field of Classification Search
CPC .. G01R 1/04; G01R 33/0005; G01R 33/0047; G01R 33/0052; G01R 33/07; F16C 41/007; F16C 2326/02; F16C 33/723; F16C 19/186; F16C 33/7879; G01P 3/443; G01P 3/487; G01D 5/145; G01D 5/2451; G01D 5/14; G01D 5/244; G01D 5/12; F16J 15/326
IPC ....................................................... G01P 3/443
See application file for complete search history.

(56) References Cited

U.S. PATENT DOCUMENTS

| | | | | |
|---|---|---|---|---|
| 5,975,761 A | * | 11/1999 | Ouchi | .................... F16C 33/723 324/207.25 |
| 6,127,819 A | * | 10/2000 | Ouchi | ........................ G01P 1/02 324/173 |
| 6,231,241 B1 | * | 5/2001 | Ohkuma | .................. F16C 35/06 324/173 |
| 7,250,755 B2 | * | 7/2007 | Tawara | ................... G01P 1/026 324/207.2 |
| 2010/0001720 A1 | * | 1/2010 | Mizutani | ............. B60B 27/0005 324/207.25 |

(Continued)

FOREIGN PATENT DOCUMENTS

| | | | |
|---|---|---|---|
| DE | 4213979 A1 | 4/1993 | |
| DE | 19625746 A1 | 2/1998 | |

(Continued)

*Primary Examiner* — Alesa Allgood

(57) ABSTRACT

An integrated wheel speed measuring device according to an exemplary embodiment of the present invention includes: a hub which is installed inside a wheel bearing; a magnetic encoder which is installed by being inserted into a recessed portion that is provided in one surface of the hub; and a wheel cap which surrounds the one surface of the hub and the recessed portion, in which the magnetic encoder has a cylindrical shape, and is installed in the recessed portion in a longitudinal direction thereof.

6 Claims, 5 Drawing Sheets

(56) References Cited

U.S. PATENT DOCUMENTS

2010/0182762 A1* 7/2010 Itomi ................ G01D 5/24452
361/807
2012/0177312 A1* 7/2012 Aritake ................ F16C 33/768
384/446

FOREIGN PATENT DOCUMENTS

JP 2008-185557 * 1/2007 ............... G01D 5/12
KR 10-2009-0054525 A 6/2009

* cited by examiner

<PRIOR ART>

<PRIOR ART>

INTEGRATED WHEEL SPEED MEASURING
DEVICE

CROSS-REFERENCE TO RELATED
APPLICATIONS

This application claims priority to and the benefit of Korean Patent Application No. 10-2013-0140989 filed in the Korean Intellectual Property Office on Nov. 19, 2013, the entire contents of which are incorporated herein by reference.

TECHNICAL FIELD

The present invention relates to an integrated wheel speed measuring device, and more particularly, to an integrated wheel speed measuring device which is provided inside a wheel bearing hub.

BACKGROUND ART

In general, an encoder is a device that detects a displacement, a rotation direction, and an angle. The encoder is also used for a vehicle, and the encoder is installed on a bearing device so as to detect the number of revolutions and a rotation direction of a wheel.

FIG. 1 is a cross-sectional view of a magnetic encoder, and FIG. 2 is an exploded perspective view of a wheel speed measuring device in the related art.

Referring to FIGS. 1 and 2, the magnetic encoder serves to transmit a rotation speed of a wheel to a sensor. The magnetic encoder includes iron oxides that are magnetized to N/S poles on rubber. The N poles and the S poles are repeatedly disposed in a ring shape.

The magnetic encoder 16 is coupled to one surface of a wheel bearing 14, and rotated together with the wheel bearing 14 when the wheel bearing 14 is rotated. An ABS sensor 12 is positioned on a rear surface of the magnetic encoder 16, and the ABS sensor 12 senses the rotation of the magnetic encoder 16.

In general, regarding the magnetic encoder 16, there are an encoder ring type magnetic encoder that is configured separately and press-fitted into a rotating wheel of the wheel bearing 14, and an encoder seal type magnetic encoder that is configured integrally with a bearing seal rubber by magnetizing an iron oxide on the bearing seal rubber.

When the magnetic encoder 16 in the related art is used, magnetic density of the magnetized encoder needs to be high in order to obtain a stable electric current value in a wheel sensor. An area of the encoder is an important factor in increasing the magnetic density, and the magnetic density is increased as areas of portions, where the encoder is magnetized to the N poles and the S poles, become larger. Therefore, in the case of the encoder ring type magnetic encoder and the encoder seal type magnetic encoder, a radius of the encoder needs to be a predetermined value or more in order to satisfy target sensitivity of the sensor.

LITERATURE OF RELATED ART

Korean Patent Application Laid-Open No. 10-2009-0054525

SUMMARY OF THE INVENTION

The present invention has been made in an effort to provide an integrated wheel speed measuring device in which an encoder is configured inside a hub, and an inside depth of the hub is adjusted, such that an area of the encoder is increased, and a target sensing value is satisfied.

The present invention has also been made in an effort to provide an integrated wheel speed measuring device in which a wheel sensor is assembled with a wheel cap using an O-ring, such that a sealed structure of a bearing is maintained.

The present invention has also been made in an effort to provide an integrated wheel speed measuring device in which a separate encoder ring is not required because an encoder is configured integrally with a hub, and an inner seal is not required because a wheel bearing cap is applied, thereby reducing costs.

An exemplary embodiment of the present invention provides an integrated wheel speed measuring device including: a hub which is installed inside a wheel bearing; a magnetic encoder which is installed by being inserted into a recessed portion that is provided in one surface of the hub; and a wheel cap which surrounds the one surface of the hub and the recessed portion, in which the magnetic encoder has a cylindrical shape, and is installed in the recessed portion in a longitudinal direction thereof.

The integrated wheel speed measuring device may further include: a burring portion which is formed by burring at a center of the wheel cap; and a wheel sensor which penetrates the burring portion, and is positioned at a central portion of an inner wheel coupled to an outer circumferential surface of the hub.

The integrated wheel speed measuring device may further include an O-ring which is inserted between the wheel sensor and the burring portion.

According to the integrated wheel speed measuring device of the present invention, the encoder is provided inside the hub, and an area of the encoder is increased, thereby satisfying a target sensing value. In this case, since the sensor is assembled with the wheel cap using the O-ring, a sealed structure of a bearing may be maintained.

A separate encoder ring is not required because the encoder is configured integrally with the hub, and an inner seal is not required because the wheel bearing cap is applied, thereby reducing costs.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
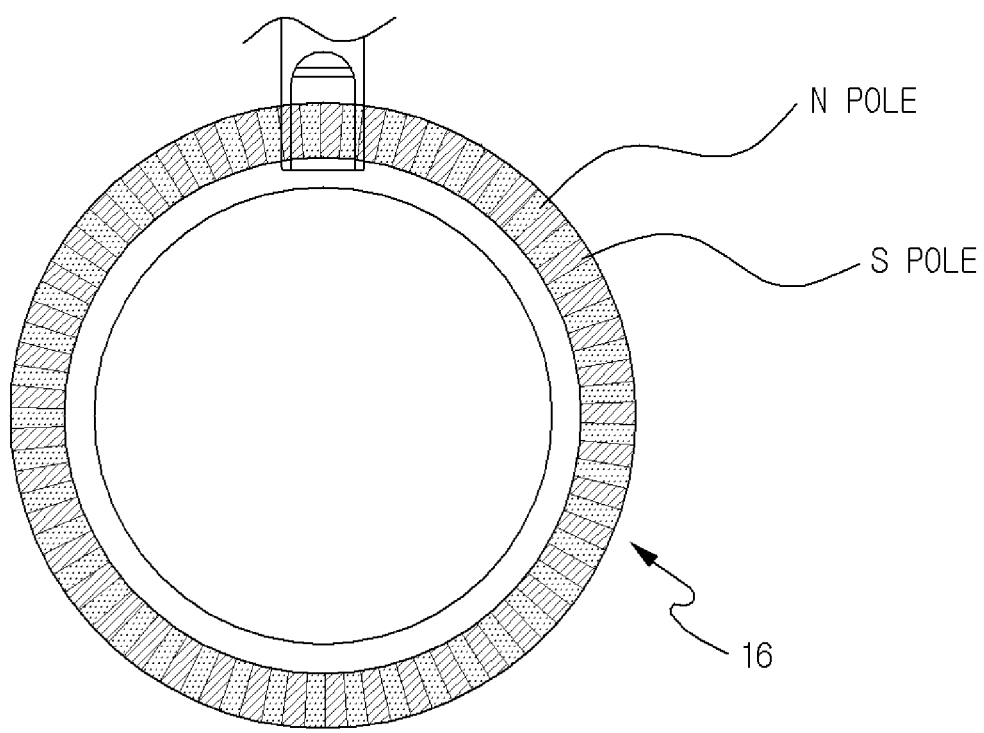
FIG. 1 is a cross-sectional view of a magnetic encoder.
Figure 2:
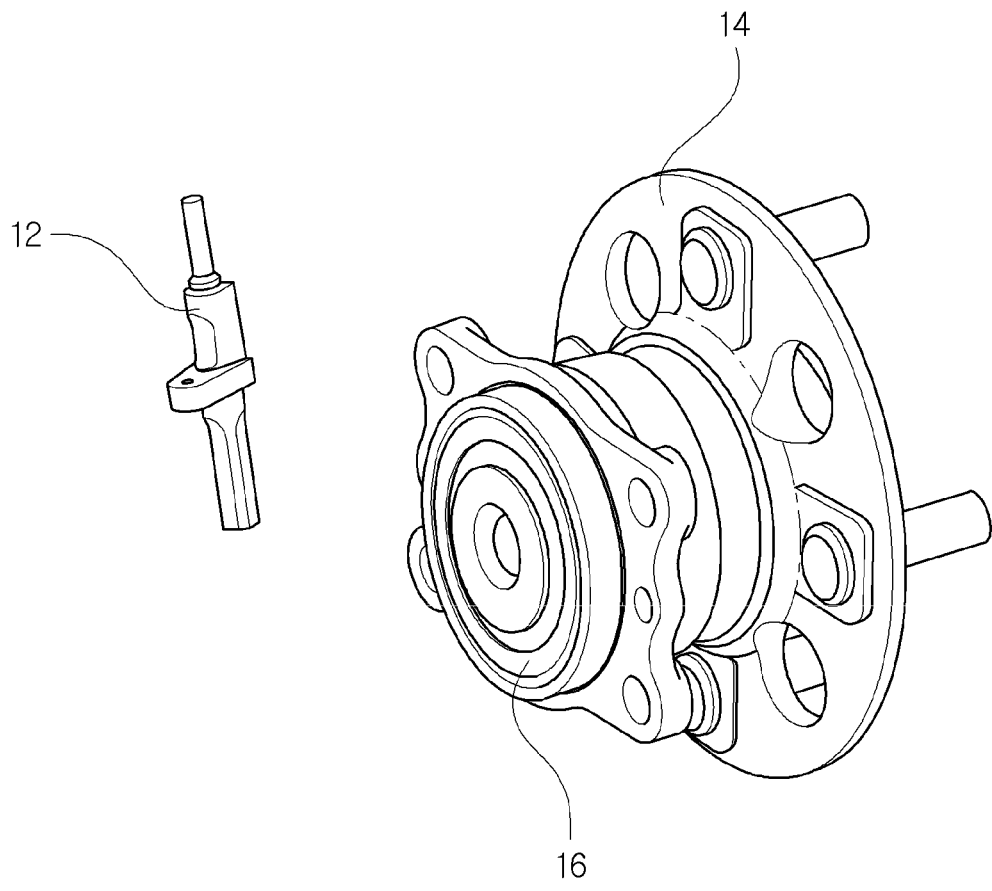
FIG. 2 is an exploded perspective view of a wheel speed measuring device in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, an integrated wheel speed measuring device according to an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, it is obvious that the technical spirit of the present invention is not restricted or limited thereto, but the exemplary embodiment of the present invention may be modified by a person with ordinary skill in the art to be variously carried out.

Figure 3:
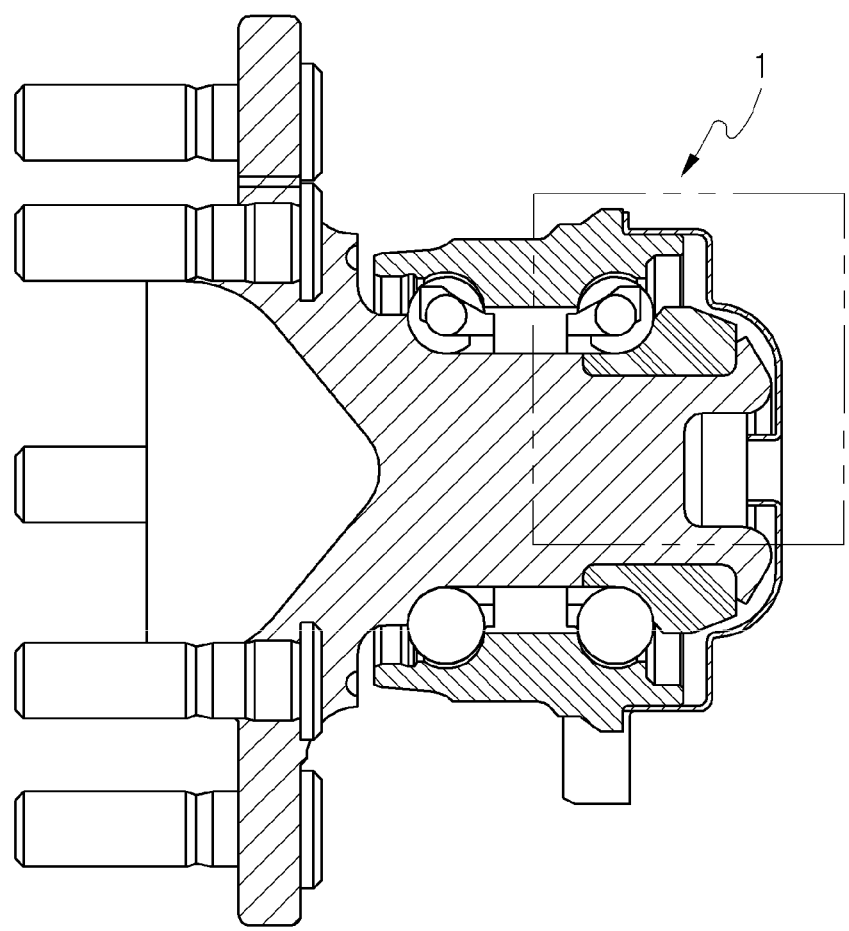
FIG. 3 is a cross-sectional view of an integrated wheel speed measuring device according to an exemplary embodiment of the present invention.
Figure 4:
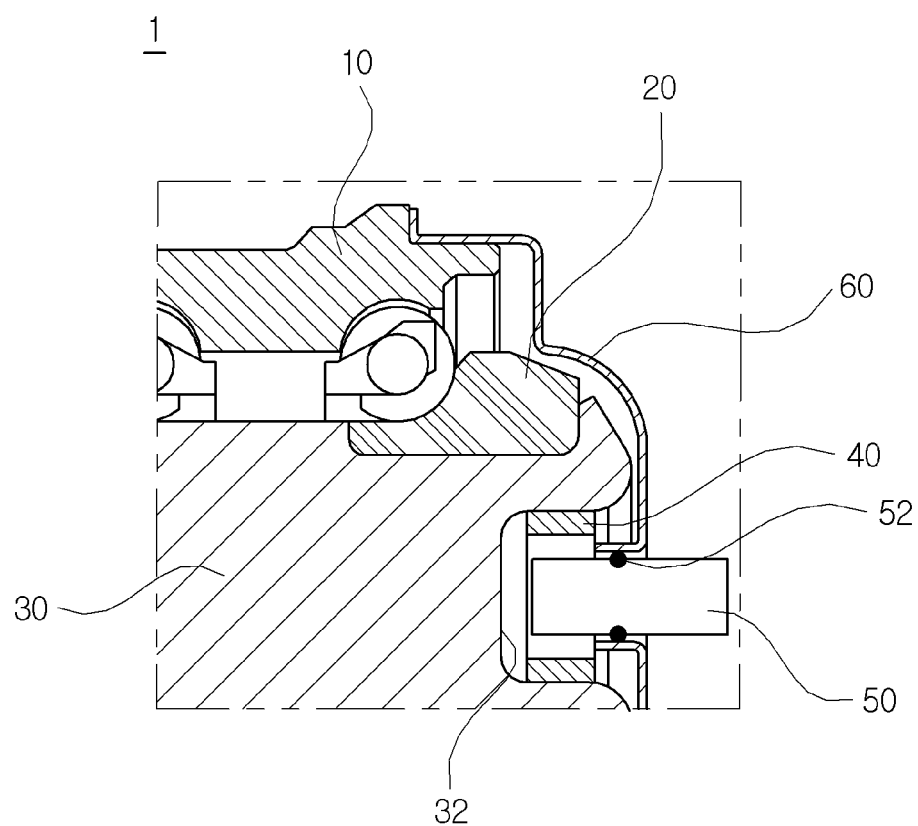
FIG. 4 is an enlarged view of FIG. 3.
Figure 5:
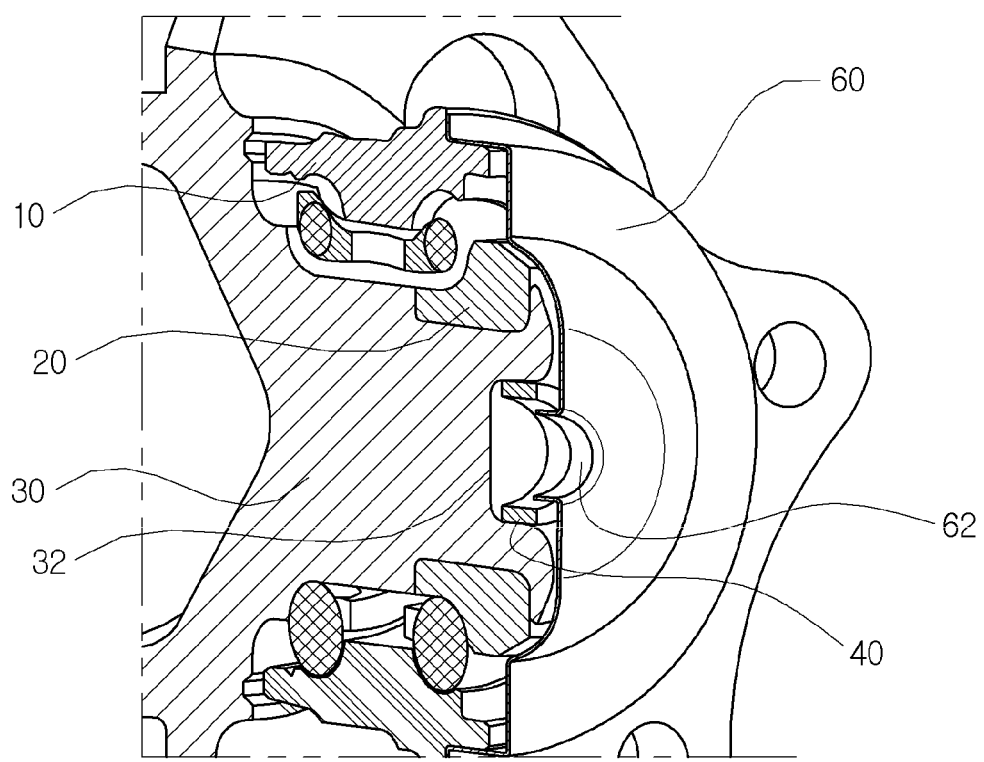
FIG. 5 is a cross-sectional perspective view of FIG. 3.

FIG. 3 is a cross-sectional view of an integrated wheel speed measuring device according to an exemplary embodiment of the present invention, FIG. 4 is a cross-sectional enlarged view of the integrated wheel speed measuring device according to the exemplary embodiment of the present invention, and FIG. 5 is a cross-sectional perspective view of the integrated wheel speed measuring device according to the exemplary embodiment of the present invention.

Referring to FIGS. 3 to 5, an integrated wheel speed measuring device 1 according to the exemplary embodiment of the present invention includes a hub 30, a magnetic encoder 40, a wheel sensor 50, and a wheel cap 60.

A groove is formed in an outer circumferential surface of the hub 30, and an inner wheel 20 is installed in the groove. The hub 30 is surrounded by a part of an outer circumferential surface of the inner wheel 20 and an outer wheel 10 coupled to the outer circumferential surface of the hub 30. A cylindrical recessed portion 32 is provided in one surface of the hub 30.

The magnetic encoder 40 is installed by being inserted in a longitudinal direction into the cylindrical recessed portion 32 that is formed in the one surface of the hub 30, and rubber including an iron oxide is vulcanized and then magnetized.

The wheel sensor 50 senses the rotation of the magnetic encoder 40. The wheel sensor 50 may be modified in various forms within the technical spirit as long as the wheel sensor 50 senses the rotation of the magnetic encoder 40. In one exemplary embodiment of the present invention, a cylindrical wheel sensor or a "]" shaped wheel sensor may be used.

The wheel cap 60 surrounds the outer wheel 10, the inner wheel 20, the hub 30, and the recessed portion 32, and has a burring portion 62 that is formed by burring in the vicinity of a center of the wheel cap 60.

The wheel sensor 50 is mounted on an inner surface of the magnetic encoder 40 by the burring portion 62 of the wheel cap 60. In this case, there may be a gap when the wheel sensor 50 is inserted into the burring portion 62, and there may be a problem in that dust or foreign substances flow in through the gap. In order to prevent the aforementioned problem, the wheel sensor 50 is seated on the burring portion 62 of the wheel cap 60 using an O-ring 52, such that the inflow of dust or foreign substances may be prevented by maintaining a sealed structure.

In a case in which it is necessary to increase output performance of the wheel sensor 50 using the magnetic encoder 40, magnetic density (intensity of magnetism) of the encoder needs to be increased. As a method of increasing magnetic density, a method of changing a material of the encoder to a material having high magnetic density, and a method of increasing an outer diameter of the encoder or a thickness of the encoder are being used.

In the integrated wheel speed measuring device 1 according to the exemplary embodiment of the present invention, a depth of the recessed portion 32, which is formed in the hub 30, is adjusted, and the magnetic encoder 40 having an increased length is installed by being inserted into the recessed portion 32, such that an area of the magnetic encoder 40 which is sensed by the wheel sensor 50 is increased, thereby increasing output performance of the wheel sensor 50.

According to the integrated wheel speed measuring device 1 of the present invention, the magnetic encoder 40 is provided inside the hub 30, and an inside depth of the hub 30 is adjusted, such that an area of the magnetic encoder 40 is increased, and a target sensing value may be satisfied. In this case, since the sensor is assembled with the wheel cap 60 using the O-ring 52, a sealed structure of a bearing may be maintained.

A separate encoder ring is not required because the magnetic encoder 40 is configured integrally with the hub 30, and an inner seal is not required because the wheel cap is applied, thereby reducing costs.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An integrated wheel speed measuring device comprising: a hub which is installed inside a wheel bearing; a magnetic encoder inserted into a recessed portion, the recessed portion being provided in a side portion of the hub; a wheel cap which covers the side portion of the hub, the wheel cap including a burring portion, the burring portion being disposed in a central portion of the wheel cap in a side elevation view of the device and having an annular cylindrical shape; and a wheel sensor which penetrates the burring portion such that an outer circumferential surface of the wheel sensor faces an inner circumferential surface of the burring portion, wherein the magnetic encoder has an annular cylindrical shape, the magnetic encoder having a length in a rotational axis direction of the magnetic encoder and a thickness in a radial direction of the magnetic encoder, the length in the rotational axis direction being greater than the thickness in the radial direction, the thickness in the radial direction of the magnetic encoder corresponding to a difference between an outermost radius and an innermost radius of the magnetic encoder, the magnetic encoder being installed in the recessed portion such that an outer surface of the magnetic encoder contacts an inner surface of the recessed portion.

2. The integrated wheel speed measuring device of claim 1, wherein the recessed portion has a cylindrical inner space.

3. The integrated wheel speed measuring device of claim 1, wherein the burring portion protrudes from an inner surface of a side portion of the wheel cap along a direction parallel to the rotational axis direction of the magnetic encoder.

4. The integrated wheel speed measuring device of claim 1, wherein the wheel sensor is positioned at a central portion of an inner wheel in the side elevation view of the device, the inner wheel being coupled to an outer circumferential surface of the hub, the wheel sensor sensing rotation of the magnetic encoder.

5. The integrated wheel speed measuring device of claim 4, further comprising:
    an O-ring which is inserted between the wheel sensor and the burring portion of the wheel cap.

6. The integrated wheel speed measuring device of claim 4, wherein the wheel sensor has a cylindrical shape.

\* \* \* \* \*